United States Patent [19]

Germanton et al.

[11] Patent Number: 5,014,793
[45] Date of Patent: May 14, 1991

[54] VARIABLE SPEED DC MOTOR CONTROLLER APPARATUS PARTICULARLY ADAPTED FOR CONTROL OF PORTABLE-POWER TOOLS

[75] Inventors: Damon Germanton, Kennalon; Menahem Lehr, Teaneck, both of N.J.

[73] Assignee: Measurement Specialties, Inc., Wayne, N.J.

[21] Appl. No.: 335,744

[22] Filed: Apr. 10, 1989

[51] Int. Cl.$^5$ .............................................. B23Q 5/00
[52] U.S. Cl. ........................................ 173/12; 173/20; 81/473; 73/862.36
[58] Field of Search ...................... 173/12, 20; 81/473; 73/862.08, 862.23, 862.33, 862.36

[56] References Cited

U.S. PATENT DOCUMENTS

| | | |
|---|---|---|
| 4,077,736 | 3/1978 | Hutchens . |
| 4,292,571 | 9/1981 | Cuneo . |
| 4,413,936 | 11/1983 | Kuhlmann . |
| 4,418,765 | 12/1983 | Mori et al. . |
| 4,487,270 | 12/1984 | Huber . |
| 4,534,420 | 8/1985 | Goldelius . |
| 4,540,318 | 9/1985 | Hornung et al. . |
| 4,571,696 | 2/1986 | Bitzen ............................. 173/12 X |
| 4,671,364 | 6/1987 | Fink et al. ............................. 173/12 |
| 4,745,557 | 5/1988 | Pekar . |
| 4,756,216 | 7/1988 | Lo ..................................... 173/12 X |

Primary Examiner—Frank T. Yost
Assistant Examiner—Willmon Fridie
Attorney, Agent, or Firm—Arthur L. Plevy

[57] ABSTRACT

A portable electric power tool having a DC motor for driving tool bit is controlled according to speed and torque by employing a zero displacement switch means which is coupled to the tool and operative to provide an output voltage porportional to the pressure applied to the switch means via the hand of the user. The zero displacement switch interfaces with a piezoresistive array which produces a voltage output proportional to the pressure applied to the zero displacement switch. The voltage output of the array is applied to control circuit means which are coupled to the motor and which controls the speed of the motor according to the pressure applied to the switch. There is further included motor control circuitry which operates to monitor the current through the DC motor to control the speed of the motor according to the torque imparted upon the tool bit being accommodated by the portable electric tool.

16 Claims, 3 Drawing Sheets

FIG. I

VARIABLE SPEED DC MOTOR CONTROLLER APPARATUS PARTICULARLY ADAPTED FOR CONTROL OF PORTABLE-POWER TOOLS

BACKGROUND OF THE INVENTION

This invention relates to a variable speed DC motor control module which can be employed for use with electric power tools such as power screw drivers and drills, and more particularly there is described a variable DC motor controller utilizing a zero displacement switch and associated electronic control circuitry.

The field of control devices for power tools is widespread. The prior art is cognizant of many devices which operate to control the speed of a rotational tool such as a drill bit, a screw driver shaft, and other such tools as well. In order to understand the type of prior art, a few definitions of concern will be explained. The majority of hand-held electric screw drivers today accomplish what is commonly called torque limiting by the use of a clutch. These devices decouple power not torque. Ideally, when such a device stalls, certain of the devices convert power into torque. To understand this, one must delve into the nature of the terms. Torque is a moment of rotational force expressed in pounds-feet or Newton-meters. Torque has no time component.

Torque, therefore, is only a component of what really drives the screw or drill. In very simple terms horse power is derived from torque times RPM. As one will ascertain, this term--namely, horse power does have a time component. This relationship is accurately portrayed in the workings of a common reduction gear. Ignoring other factors, 100 pounds-feet of torque at a 100 revolutions per second driving through a 10:1 reduction gear will output a 1.000 pounds-feet of torque at 10 RPS. This phenomenon is generally called "torque multiplication".

The term is apt because the horse power produced is identical: 100 × 100 or 1.000 × 10 still equals 10.000 units per second. Thus, dead lifting 550 pounds-feet per second equals 1 HP. This has several ramifications as applied to DC electric motors or other wound coil EMF devices. The most important is that at zero RPM the motor produces zero horse power and at any RPM up to its intrinsic maximum, an electric motor's horse power is directly related to its RPM.

The above is important because any electric motor has an intrinsic torque; a product of motor design constraints and not power or gearing variables. By far, the most important of these are the number, diameter and placement of the windings in the motor. The EMF produced by a given motor is governed mostly by the physical properties of its armature and stator. Only the rate of magnetic saturation is governed by electrical constraints. Voltage increases or decreases therefore only cause the motor to run faster or slower, but since the same EMF is produced, the same torque is produced. Since the motor spins at a different RPM the same torque produces more or less horse power. Only by producing a motor with variable coil parameters can one directly control the torque of the motor. As one will understand, this is extremely complex and very expensive. Thus, as one can see, it is the horse power and not the torque that does the real work in regard to DC motors.

The torque limiters which are employed on dedicated electric screw drivers or drills typically use a sprag (cone and cup) or dry plate friction-clutches preloaded by a spring to a user selected slippage point. These are real clutches and when stalled, they may actually behave as torque converters. The motor runs at a constant speed (and horse power) and when the resistance of the load which is the screw or tool being driven exceeds the clutches ability to hold, the load is partially or totally decoupled from the motor by slippage. The excess is wasted as friction generated heat and motor braking. It is critical to note that this process is not inherently smooth and what smoothness there is depends on a multitude of interrelated factors many of which depend on use, temperature, moisture, material hardness, penetrability, preload selection, and fastener type. These, of course, are just a few of the relevant factors. The friction surfaces may slide but they can and do also bounce against one another causing force to be applied as an oscillating load to the output.

The driven shaft experiences alternating full and no loads as the clutch grabs and then disengages. If the frequency of the bouncing is slow, it will be felt as a pronounced shuddering or even jumping of the tool. Users have experienced this in utilizing power drills as well as power screw drivers. Less expensive tools use an even less desirable alternative. Such tools employ planetary gear sets which disengage from one another by a floating preloaded ring gear. These types do not produce torque conversion even when stalled but rather something akin to ratcheting horse power. The effect is clutch like, but since they are not slippage devices, they cannot convert power into moment.

In any case, it is the primary operational disadvantage of all mechanical couplers. A grabbing clutch can be a very pronounced hazard especially at high shaft speeds with hard to start but easy penetrated materials like predrilled sheet metal. High initial preload and load slip are required to start the fastener, but once threading is complete, the load drops radically with a correspondingly rapid increase in shaft speed. This condition is worsened by the high multiplication gear boxes typical of these types of tools which have a great deal of rotating mass and hence much inertia.

The high preload on the clutch plates which is necessary to thread the screw now becomes an enemy. When the already threaded and now furiously spinning fastener bottoms, the tool will jump resulting in at least a momentary loss of contact. This usually causes stripped screw heads and certainly reduces the life of driver bits. This can be reduced substantially by modulating the motor speed with a variable resistance hand-operated trigger. However, this requires a great deal of skill on the part of the user and is not a successful solution. Thus, another way to overcome the situation is for the tool user to exert a large amount of pressure on the bit using his body weight and arm strength to counter the kick from the tool. Thus, as one can ascertain, soft fasteners as those fabricated from aluminum and so on often strip anyway due to the high inertia and so on.

Extensive industrial tools often go so far as to add complex centrifugal or overruning mechanisms to freewheel and to thereby decouple the tool when it kicks back. In any case, only at the point where the fastener ceases to rotate does torque itself become a factor. An ideal slipping clutch converts motor power into static load (torque) plus wasted heat. However, neither of these factors are the major contributors to stripped heads and bits. The trouble is that when the clutch either seizes unexpectedly on trigger release or bounces at a slow rate with the power on, many mechanical couplers not being true clutches cannot seize or slip accordingly. Hence, they operate only by bouncing constantly.

As one will also ascertain, the load applied to the screw during clutch or ring gear bounce is exactly analogous to that of a stalled motor operating at full torque for a percentage of the time. This percentage of time is equivalent to the engagement and disengagement ratio of the bouncing clutch. If this rate is rapid, slow human responses will perceive it as a vibration or may even ignore it. As will be explained, it is this particular aspect that the control device of this invention utilizes to good advantage.

The prior art is replete with many patents which operate to control the speed of machine tools or to otherwise stop the tool when excessive operating constraints are being applied to the tool.

Reference is made to U.S. Pat. No. 4,077,736 issued Mar. 7, 1978 to Hutchens et al. entitled DRILL SPEEDER FOR MACHINE TOOLS. This patent describes a centrifugal switch which is located in the tool holder and closes when the tool holder is rotated above a predetermined speed. The switch opens when the rotary speed of the tool holder falls below the predetermined speed.

See U.S. Pat. No. 4,292,571 issued on Sept. 29, 1981 to G. Cuneo entitled CONTROL DEVICE FOR CONTROLLING THE ROTATIONAL SPEED OF A PORTABLE POWER TOOL. This patent relates to a speed control device which automatically adjusts the speed of the motor in accordance with changes in the diameter of the tool bit being used. The diameter of the tool bit is a function of the rotational speed of the motor, and the device operates to produce an output signal which controls the firing of a thyristor which in turn controls the current supplied to the motor. Thus, in this manner the speed of the drill is controlled according to the diameter of the tool bit employed in the drill. This is typical of some of the above-described prior art devices.

See also U.S. Pat. No. 4,413,936 issued on Nov. 8, 1983 an entitled CONTROL DEVICE IN A MACHINE TOOL to G. Kuhlmann. This patent relates to a mechanical means which operates to control the drive of a machine tool to an optimum speed of rotation according to the tool which is used on the machine. The apparatus relates to hand-held drills, screw drivers and so on. This is one type of mechanical approach that has been described above and has the disadvantages of the above devices.

U.S. Pat. No. 4,418,765 issued on Dec. 6, 1983 to T. Mori et al. entitled POWER DRIVEN SCREW DRIVER WITH A TORQUE CONTROL relates to a screw driver which is motor driven and operates to determine the torque which is applied to the base of the tool whereby the detected torque is compared to the signal from a torque setting device which is indicative of a desired torque and with which the screw is to be tightened. The motor is energized accordingly so that the screw driver can be operated at the proper speed. There is an adjustable time delay circuit which is connected between the comparator and a switch to delay the signal from the comparator for a period of time which can vary depending on the material that the screw is being driven into. This patent is generally pertinent to some of the concepts to be described herein but has many disadvantages in regard to the way and the manner in which the signal is detected and employed.

U.S. Pat. No. 4,487,270 issued Dec. 11, 1984 to S. Huber entitled ELECTRIC TOOL, PARTICULARLY A HANDTOOL, WITH TORQUE CONTROL shows a pressure sensor which is built into the motor shaft and which provides a signal for controlling the speed of the motor in response to an axial thrust as to control or limit the torque of the motor.

U.S. Pat. No. 4,534,420 issued on Aug. 13, 1985 to R. Goldelius entitled ELECTRIC TOOL WITH TORQUE MONITOR shows an electric tool which operates in conjunction with a pressure sensor which sensor changes as a function of mechanical pressure exerted on the motor to control the torque or speed of the motor according to this pressure.

U.S. Pat. No. 4,540,381 issued on Sept. 10, 1985 to F. Hornung et al. entitled ROTARY ELECTRICAL TOOL WITH SPEED CONTROL ESPECIALLY DRILL shows means for the selective control of the speed of the tool such as drill or screw driver which is coupled to a motor. The speed of the tool is sensed by a contactless transducer which is coupled to the chuck and to the housing to provide speed signals which control the transmission ratio of the gears. As one can ascertain, this is a relatively complicated device and is of the type of device as described above in the background of art.

U.S. Pat. No. 4,745,557 issued on May 17, 1988 to G. Pekar et al. entitled MACHINE TOOL CONTROL SYSTEM describes a complicated feedback system which controls a machine tool which is capable of drilling through multi-ply work pieces where the multi-ply work pieces comprise different thicknesses and hardness. A the machine tool setting device sets a tool tip at a predetermined distance above a work piece by detecting when the machine tool intercepts an optical beam. The control system allows for the drilling of the multi-ply work pieces wherein the drill bit's translational and rotational velocity are controlled for optimization as a function of the type of material and the thickness of the material being employed.

As one can ascertain from the above, certain prior art devices are relatively complicated or do not generally operate to perform according to desired attributes necessary to properly and reliably control a tool bit associated with an electrical drill or electric screw driver as driven by a DC motor.

It is therefore an object of the present invention to provide a controller for a hand-held power tool as a screw driver or a drill which eliminates many of the above-described problems.

It is a further object of the present invention to provide an electronic controller for a hand-held power tool which controller employs a zero displacement switch which has no moving parts thus increasing the life of the tool as well as providing reliable operation.

BRIEF SUMMARY OF THE INVENTION

The controller to be described herein employs circuitry which alters the duty cycle of electrical power applied to the motor. This is selectable in suitable steps or ranges. At a given setting, the motor receives full current and voltage but only for one half of the time limiting its horse power directly instead of mechanically decoupling it. As a drill controller, the circuit provides speed control advantages of a thyristor type circuit but without the inefficiency of destructive heating that accompanies running a motor below its designed optimum voltage. When employed in a screw driver, since the RPMs are limited as well as the power, bottoming transitions are smooth and jumping is less likely to occur. Because the power is digitally cycled and not voltage limited, an impact hammer effect is induced making hard to start screws much easier to operate with. The controller, as will be described, provides full current to the motor for a brief period during startup regardless of the power setting. Normally, this is for purposes of overcoming inertia in the motor and gear box, but it also aids in screw starting as an important adjunct. The result is that a screw can be run in with minimal down pressure by the operator, and hence there is no need for operator modulation of the trigger with a proper range selection for the particular job. Thus, full trigger pressure can be used at all times even for delicate tasks. The stripped heads and bits that a grabbing clutch or an operator can cause are virtually eliminated. The controller to be described essentially stalls the motor when the fastener is seated. The controller employs a high current shut down which stops the tool when a high current condition is sensed. Thus, as will be explained there are many unique advantages afforded by the electronic control circuit which electronic control circuit can be utilized to employ and control operation of a hand-held power tool such as a drill or a screw driver.

DETAILED DESCRIPTION OF THE FIGURES

Figure 1:
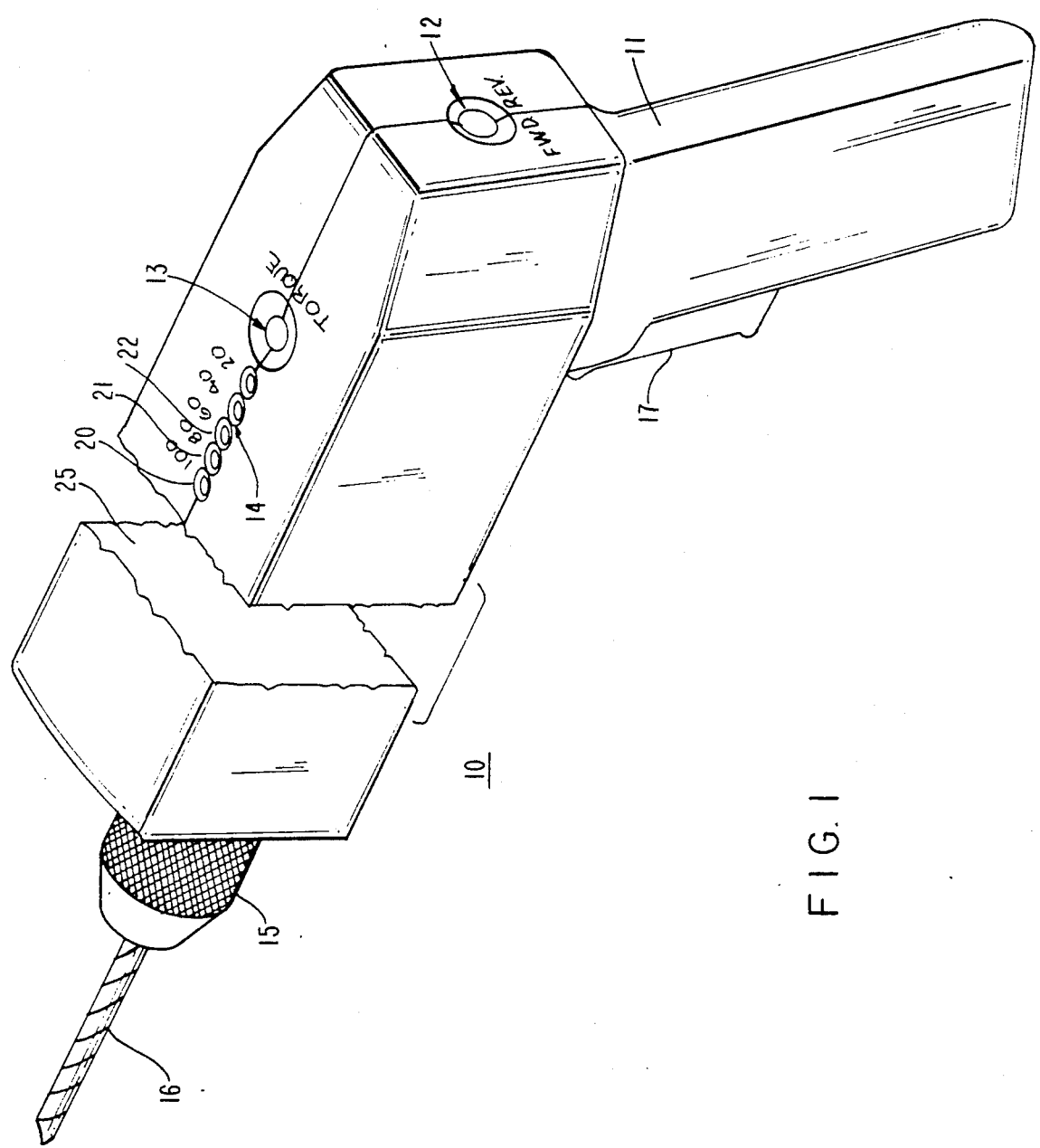
FIG. 1 is perspective plan view of a hand held power tool utilizing the controller according to this invention.

Referring to FIG. 1, there is shown a typical handheld power tool 10. As one can see, the representation depicted in FIG. 1 is of a general configuration and many alternate designs as well as alternate configurations should be discernible to one skilled in the art.

A conventional hand-held power tool such as 10 contains a handle portion 11. Shown secured to the handle portion 11 is what will be referred to as a zero displacement switch 17. As will be explained, the switch 17, is rigidly mounted with respect to the handle and engages a sensor or transducer arrangement. The zero displacement switch or member 17 is flexible or resilient and can flex as a diaphragm according to the pressure applied thereto by the hand or grip of the tool user. In this manner, the pressure applied to the switch varies the speed of the motor as will be further explained.

As can be seen in FIG. 1, a typical power tool contains a chuck 15 which is associated with a drill bit or screw driver tool member 16. These are conventional in operation and are well known. Thus, the tool can accommodate various diameter bits or drills via the conventional chuck 15. Located on the rear side of the housing of the tool 10 is a forward reverse switch 12. By activating the forward reverse switch 12, the tool bit can be made to turn in the clockwise or counter clockwise direction or be turned off as is also conventional in regard to hand-held power tools. For example, in the case of a screw driver one can cause the tool bit 16 to turn in a clockwise direction in order to place a screw into a suitable member or in a counter clockwise direction in order to remove a screw. The same aspects and operations are, of course, apparent in utilization with a hand-held drill assembly.

Also shown positioned on the housing is a torque control switch 13. As will be explained, the torque control switch 13 selects one of a plurality of ranges which specifies a given torque that the tool bit 16 is to be operated with. The ranges as selected may be shown by means of a suitable display such as LED devices as 20, 21, and 22 all associated with the display module 14. In this manner, the operator can select a given range of torque according to the materials that he is working with as for example steel, wood, plastic or some other material. It is, of course, apparent that the torque or rotational speed of the tool bit will be a function of the type of material that is being drilled into or screwed into, as for example a hard or a soft material.

The housing shown contains an internal hollow 25 for accommodating the electronics as well as a suitable DC motor which is utilized to rotate the tool bit 16. These general aspects of such hand-held power tools are known in the art.

It is, of course, understood that in regard to the forward reverse switch 12, many different types of switches can be employed as for example in lieu of a push-button or momentary switch, a rotary switch can also operate to provide the functions of switch 12. It is further indicated that instead of the push button switch 13, one can also employ a torque setting rotary switch whereby the operator can select five or six different torque ranges. Thus, as one will readily ascertain, there are numerous ways of accommodating switches 12 and 13. While the device of FIG. 1 employs an LED display, one can use an LCD display which would also present the selected torque range to the user or any other type of conventional display. It is understood that the display 14 does not have to be located on the top of the housing 10 but can be on the side or at any other convenient location in order to enable the user of the tool to view the range and to change the range as desired.

As indicated, the trigger or zero displacement switch 17 has no moving parts and is associated with a strain gage sensor array operative to sense the pressure applied to the switch by a user. The switch can be utilized alone in this manner or coupled with a simple spring-loaded actuator to suit a variety of variable speed applications.

Figure 2:
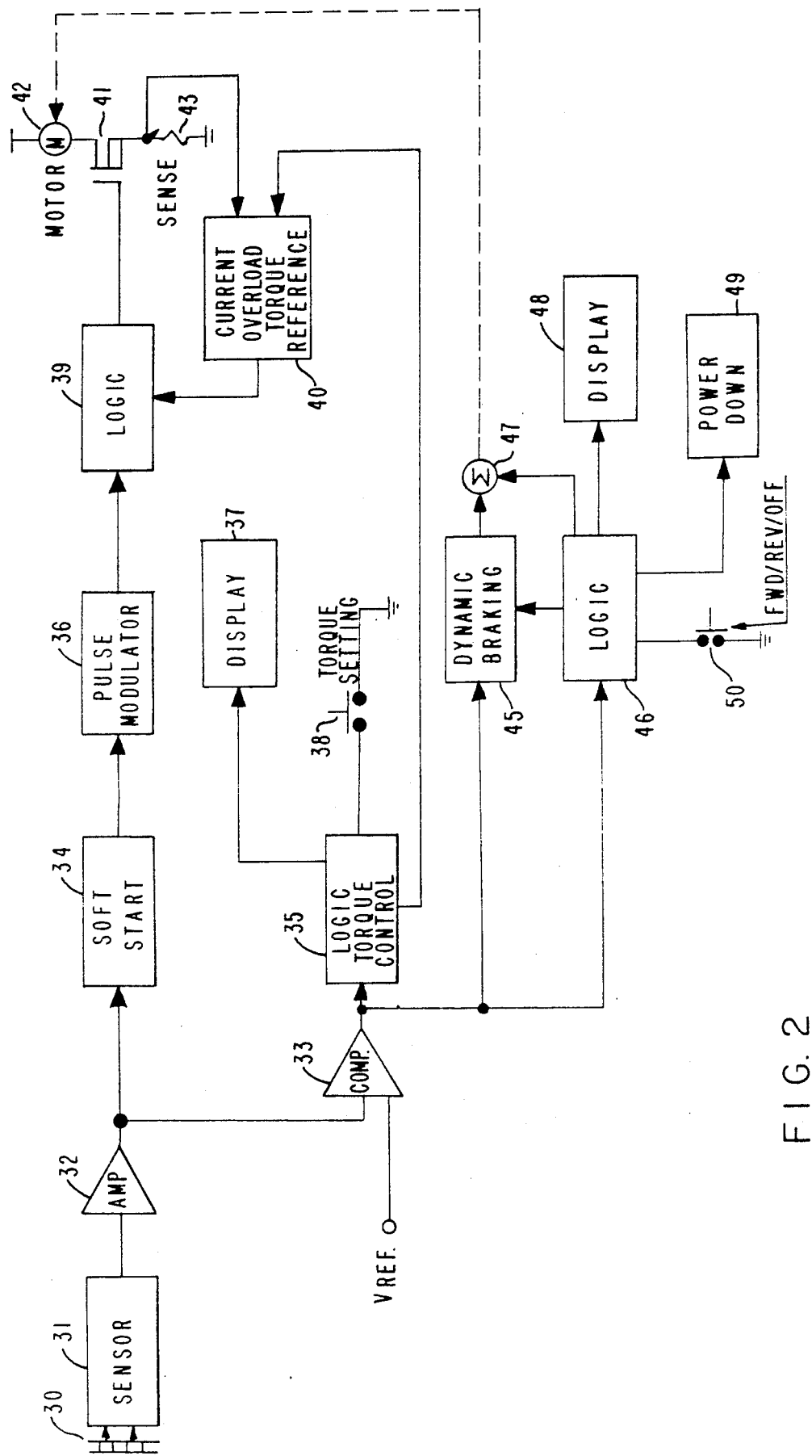
FIG. 2 is a detailed block diagram showing the variable speed DC motor controller according to this invention.

Referring to FIG. 2, there is shown a detailed block diagram of the electronic motor controller utilizing the zero displacement switch according to this invention.

As one can ascertain from FIG. 2, reference numeral 30 refers to the trigger or switch 17 shown in FIG. 1 which as indicated is fixed in position. As one applies pressure to switch 30, one activates a sensor arrangement 31. The sensor arrangement 31 contains piezoresistive sensors arranged in a Wheatstone bridge configuration. Such sensors produce an output voltage linearly related to the pressure applied to the switch 17. In this manner, the output from the sensor module 31 is a voltage which is a linear function of pressure applied to the switch 30. The voltage output of the sensor 31 is coupled to the input of an amplifier 32. The amplifier 32 has one output coupled to the input of a comparator 33. The other input of the comparator receives a reference or threshold voltage (VREF). The comparator 33 provides an output when the output of the amplifier 32 exceeds the reference voltage. This output as will be explained is processed by a logic torque control module 35 which is responsive to the particular torque range setting as selected via the torque setting switch 38 which is analogous to switch 13 shown in FIG. 1.

The logic torque control module 35 is associated with a display 37 which operates to display the torque range selected. This display is analogous to display 14 of FIG. 1. There is another output from the logic torque control module 35 which is directed to an input of a current overflow torque reference module 40. The current overload torque reference module 40 responds to the current through the DC motor 42. The return current path for the DC motor 42 is directed through a switch such as the FET 41, which has the drain or source electrode returned to ground through a resistor (sense) 43 which provides a voltage to the module 40 which is a function of the current through the motor 42. The input to the gate electrode of the field effect transistor 41 is derived from a logic module 39. The logic module 39 receives one input from the current overload torque reference module 40 and receives another input from a pulse modulator 36. The pulse modulator 36 receives an input which is indicative of the output of amplifier 32 as modified by a soft-start module 34. The module 34 is a integrating circuit which integrates the output of amplifier 32 so that abrupt or sharp voltage transitions cannot be applied to the motor 42 as will be further explained. The output of the soft-start circuit 34 is also indicative of the pressure applied to the switch 30 and is directed to the input of the pulse modulator 36. The pulse modulator 36 converts the voltage at the output of the soft-start circuit 34 into a pulse modulated signal. This pulse modulated signal is applied to one input of the logic module 39 which receives another input from the current overload torque reference 40. As indicated, the current overload torque reference circuit 40 serves to sense or monitor the current through the motor 42. The current through the motor is proportional to the torque exerted on the driven tool bit.

The current overload torque reference 40 monitors the current through the motor with respect to the output from the logic torque control circuit 35 and determines whether or not the current through the motor is indicative of the proper torque specified by the particular range selected. The FET 41 is driven at the gate electrode by logic module 41 which waveform is a variable duty cycle rectangular wave. The duty cycle of the wave is a function of the voltage output of amplifier 32 which output voltage is used to provide a variable duty cycle waveform via the pulse modulator 39. The output of amplifier 32 is proportional to the pressure applied to the zero displacement switch 3o as determined by the sensor 31. The FET 41 receives the pulse waveform until the output of the torque reference 40 is high and no overload has been detected. At the moment a current overload is detected via torque reference 40, the FET 41 is forced to turn OFF and the FET opens the ground return to the motor thus stopping the motor.

The output of the comparator 33 is also directed to a dynamic braking module 45 and to the input of an additional logic circuit 46. The additional logic circuit 46 is associated with the forward reverse switch 50 which is analogous to switch 12 of FIG. 9. The output of the logic module is directed to a display 48 to determine whether the machine tool is on or off or whether the motor is operated in the clockwise or counter clockwise direction. For example, in an On condition the display provides a red visual indication and no indication for the Off condition. The output of the logic module 46 is directed to a summer circuit 47 which receives another input from the dynamic braking module 48. The summer circuit 47 controls the braking of the motor by as indicated by the dashed line. This braking is controlled by the dynamic braking circuit 45 which senses the output of the comparator and provides a braking signal if a predetermined resistance is exerted on the tool bit as it is being rotated by the motor 42.

The function of the dynamic braking module 45 is to stop the motor 41 rapidly when the trigger 30 is released for any reason. This provides automatic and instantaneous dynamic braking of the motor 42 via the circuitry contained in the dynamic braking module 45. The torque setting switch 38 is shown in FIG. 2 and shown in greater detail in FIG. 3 enables one to select up to six or more different settings from 40 percent to full torque and can be arranged in increments of 20 or according to any other convenient scale.

There is also shown a power-down module 49 which operates to remove a circuit ground when power is off and hence when the hand tool is not operating, as will be further explained.

It is, of course, understood that the module as described above controls motor torque as well as speed and one can specify the exact torque range by setting switch 38 or switch 13 of FIG. 1 to operate the machine tool within a given range of torque.

Figure 3:
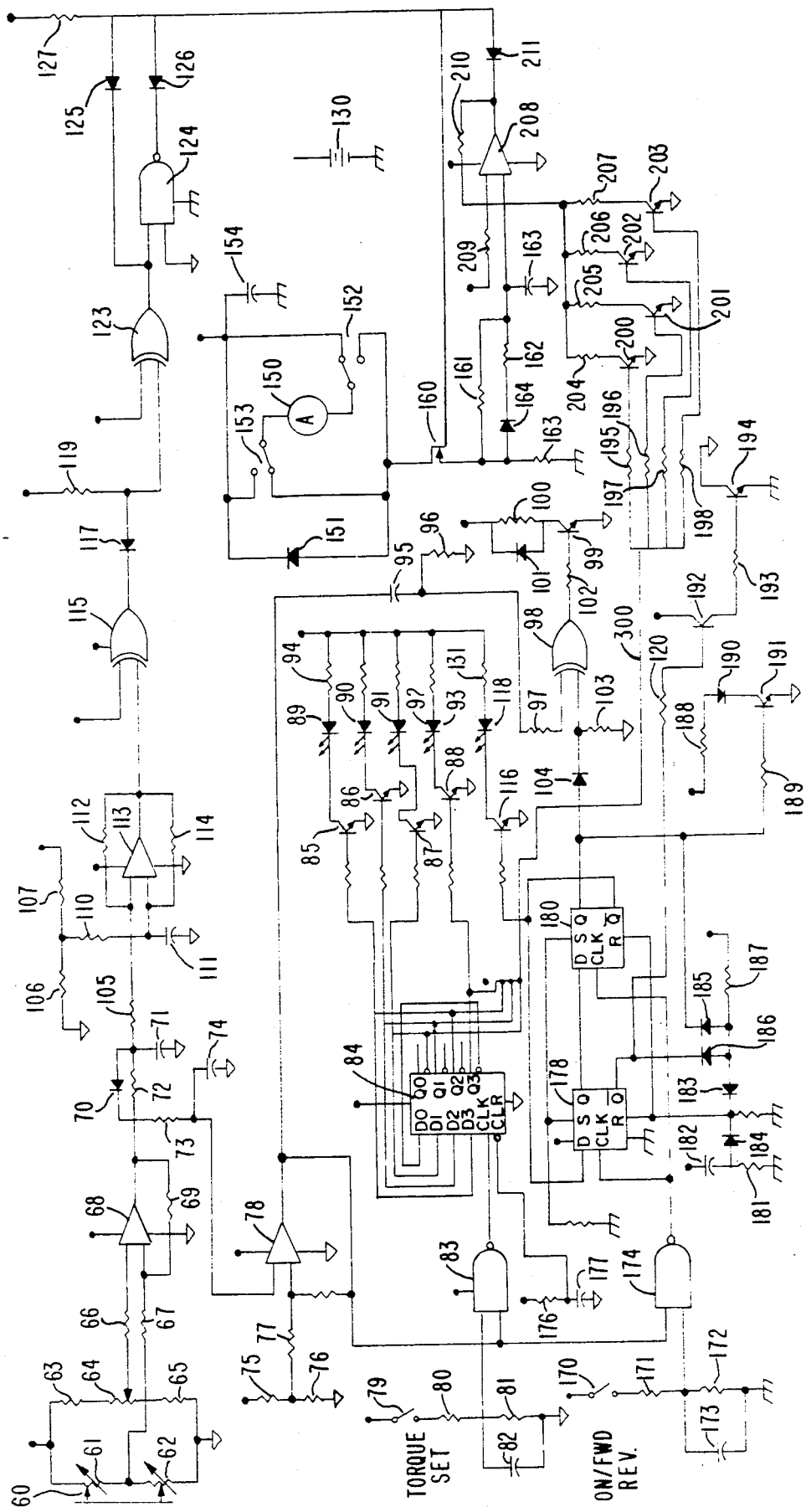
FIG. 3 is a detailed schematic diagram of the motor controller according to this invention.

Referring to FIG. 3, there is shown a detailed schematic diagram of the variable speed DC motor controller and the associated logic. As seen in FIG. 3, the trigger switch 60 is directly associated with a piezoresistive Wheatstone bridge array wherein resistor 61 and 62 are piezoresistors. Resistors 63 and 65 are fixed resistors with resistor 64 being a potentiometer. In this manner, when a pressure is applied on the trigger switch 60, resistors 61 and 62 change their value according to applied pressure. The potentiometer 64 is used to balance the bridge to provide a zero output when no pressure is applied. Resistors 63 and 65 are fixed resistors and are utilized to complete the bridge.

The Wheatstone bridge array as shown in FIG. 3 is a conventional circuit. Semiconductor strain gages as 61 and 62 provide a linear output with applied pressure and exhibit little hysterisis due to the piezoresistive action. This results in a smooth control of the motor speed is both the clockwise and counter clockwise direction. The output from the Wheatstone bridge is applied via resistors 66 and 67 to inputs of an operational amplifier 68. The operational amplifier 68 has a resistor coupled between input and output which resistor 69 determines the gain of the operational amplifier. The output of the operational amplifier 68 is directed to a circuit consisting of diode 70 and capacitor 71. The diode 70 is shunted by resistor 72. The circuit when receiving a fast rise time input waveform as developed when an increased pressure is applied to switch 60, converts the fast rise time to a slow rise time waveform as applied to operational amplifier 113. The diode 70 operates to provide a shunt for resistor 72 to prevent the motor turning backward after reversing the direction of the motor by dynamic braking.

The above-noted circuit operates as a low pass filter and essentially performs the function of the soft-start circuit 34 of FIG. 2. The DC output of the circuit which follows the voltage emanating from the bridge circuit is directed through resistor 105 to one input terminal of a pulse width modulator 113. The operational amplifier 113 is arranged in a self-oscillating configuration and has a frequency of operation determined by resistors 106, 107, resistor 110 and capacitor 111. The junction between resistor 110 and capacitor 111 is coupled to another input of the operational amplifier 113. As is seen, the pulse width modulator 113 includes an operational amplifier having feedback resistors 112 and 114 coupled from the output to the respective inputs. In this manner, the pulse width modulator 113 produces at an output a pulse width modulated signal which is a function of the input voltage applied via resistor 105 or which is a direct function of the pressure applied to the trigger switch 60. The output of the pulse width modulator is applied to one input of an exclusive OR gate 115 which acts as an inverter. The other input of the OR gate 115 is directed to a V+supply voltage. The exclusive OR gate 115 has its output coupled to the cathode of a diode 117 which receives a bias via resistor 119.

The anode of the diode 117 is connected to one input of an exclusive OR 123 whose output is applied to an input of a NAND gate 124. The output of the NAND gate 124 is coupled via a diode 126 to the gate electrode of the FET 160. The FET 160 functions the same as FET 41 of FIG. 2.

The NAND gate 124 receives true battery ground while the exclusive OR gate 123 receives a controlled ground. The diodes 125, 126 and NAND gate 124 prevent the motor 150 from turning when the ON/OFF switch 170 is in the OFF state. In the OFF state the controlled ground is HIGH and the output of gate 123 is also HIGH because of the ground. The output of gate 124 is low and therefore FET 160 is off. When the switch 170 is in the ON state the controlled ground is low, the output of gate 124 is high and hence gate 124 is not active. The FET 160 is fed from gate 123 via diode 125 and comparator 208 with diodes 125 and 211 operating as an AND gate. As indicated in FIG. 2, the FET 160 provides a ground return for the DC motor 150. This ground return is supplied via FET 160 and via resistor 163 to ground. The motor 150 is associated with two single-pole double-throw (SPDT) contacts 153 and 152 which are relay contacts and which are operated by means of coil 100 which coil is coupled to the collector electrode of transistor 99. A diode 101 appears across the coil to prevent voltage transients from damaging the transistor 99. As will be explained, transistor 99 by operating the relay determines the rotational direction of the motor 150, as for example in the clockwise or counter clockwise direction. The diode 151 which is placed across the motor terminals acts as a transient suppression diode with capacitor 154 acting as a filter capacitor.

As simply seen in FIG. 3, the FET device being in series with the motor 150 for both counter clockwise and clockwise operation controls the amount of current that can be directed through the motor and hence the torque or speed at which the motor will operate.

As one will also ascertain from FIG. 3, the output of the operational amplifier 68 is coupled via a resistor 73 and a capacitor 74 to one input of the comparator 78. The resistor 73 and capacitor 74 operate as a time delay circuit. The comparator 78 receives a reference voltage via the voltage divider consisting of resistors 75 and 76. Voltage is applied to one input of the operational amplifier comparator via resistor 77 to serve as a threshold for the comparator. The comparator 78 performs the same function as comparator 33 of FIG. 2.

The output of the comparator 78 is AC coupled via capacitor 95 and resistor 97 to one input of an exclusive OR gate 98 having its output coupled via resistor 102 to the base of transistor 99.

Referring to FIG. 3, at the left-hand side, there is shown a switch 79 which switch 79 is designated as the torque setting switch and is analogous to switch 38 of FIG. 2 as well as switch 12 of FIG. 1. The torque setting switch can operate to set the torque range for the motor as follows. Switch 79 is a push-button switch as shown. If switch 79 is activated, a voltage is applied to one input electrode of NAND gate 83 via resistors 80 and 81 with capacitor 82 serving to shunt resistor 81. The NAND gate 83 receives one input from the comparator 78 and another input from the switch 79. The output of comparator 78 which is coupled to NAND gates 83 and 174 operates to disable the switches 79 and 170 when the output of the operational amplifier 68 is above the threshold of comparator 78 as determined by resistors 75 and 76. When the motor 150 is operating the output of comparator 78 is low. The shift register 84 operates to provide the torque range as selected by the user. This is done by advancing the shift register one position for each pulse applied via switch 79. The output of the shift register is coupled to a plurality of transistors as 85, 86, 87, 88. These transistors each have an LED device coupled to the collector electrode as LED devices 89, 90, 91, 92. These LED devices are the LED devices shown for example in FIG. 1 which display the selected torque range. Hence, the operator of the machine tool by depressing switch 79 can step the shift register 84 through the different torque ranges and be aware of which torque range he selects by means of the LED indicators 89, 90, 91, 92. Also shown in FIG. 3 is a switch 170. Switch 170 performs the same function as the forward/reverse switch 12 of FIG. 1 or the forward/reverse On/Off switch 50. Switch 120 is again a push button switch which when activated applies a voltage to the input of a NAND gate 174. The gate 174 is biased at the input terminal by means of resistors 171 and 172 with resistor 172 again being shunted by capacitor 173. The output of gate 174 is coupled to the clock inputs of D-type flip flops 178 and 180 which are arranged in a counting configuration and by means of the diodes as for example 184, 183, 186 and 185 is confined to count between three states. As one can ascertain from FIG. 3, the output of the flip flop 180 is directed via diode 104 to one input of the exclusive OR gate 98. Exclusive OR gate 98 has its output coupled via resistor 102 to the base electrode of transistor 99 which controls the relay coil 100 as described. Thus, for a (1,0) state of flip flops 178 and 180 the motor 150 is driven in the forward direction based on the position of relay contacts 153 and 152. In a similar manner for a (1,1) condition of flip flop 178 and 180, the motor is driven in the reverse state based on the switching of contacts 153 and 152. The output of flip flop 180 which forms part of the counter is directed by resistor 189 to the base electrode of transistor 91. The collector electrode of transistor 91 is applied to the source of biasing potential through resistor 188 and LED device 190. When the counter is in a state indicative of the reverse motor mode as the (1,1) state, flip flop 180 causes transistor 116 to conduct thereby illuminating LED 93 indicating to the user that the motor is being run in the reverse direction. Thus as seen, the counters 178 and 180 provide three states as OFF (0,0), ON/FORWARD (1,0), ON/-REVERSE (1,1), with a 01 state reset back to the 00 or OFF STATE, the appropriate indicators are provided for ON/FORWARD and ON/REVERSE.

Also shown in FIG. 3, is a cable 300 which emanates from the shift register 84 and which is directed to the base electrodes of transistors 200, 201, 202 and 203. Each transistor receives a separate input from the shift register 84 via the base resistors 195, 196, 197 and 198. Each transistor is associated with a respective collector load as resistors 204, 205, 206 and 207. The collectors are tied together and directed to one input of operational amplifier 208 which serves as comparator. The other input of comparator 208 is coupled through a diode 164 in series with a resistor 162. The diode 164 and resistor 162 are shunted by a resistor 161 and operate to monitor the voltage across the ground return resistor 163 of the FET 160.

In this manner the operational amplifier 208 will produce an output signal when the voltage across resistor 163 exceeds a predetermined threshold. This voltage is applied via diode 211 to the gate electrode of the FET 160 to control the FET and to control the motor torque as will be further explained. It is understood that each of the transistors as 200 to 203 is responsible for operating the motor within a predetermined torque range as selected according to the torque setting implemented by means of shift register 84. Hence in each of these ranges the motor is responsive to a different torque. The operational amplifier or comparator 208 performs the same exact function as module 40 shown in FIG. 2. The entire unit is operated by means of a battery 130 which is shown on the right-hand side of FIG. 3. The battery 130 is a battery (7.2-12 volts) and is used to bias all the logic modules as depicted on the drawing.

Operation of the circuit is as follows. The user picks up the hand tool and first selects the forward or reverse direction for the tool bit via switch 170 as described above, if forward is selected then LED 118 illuminates indicating this, if reverse is selected then the LED device 190 illuminates indicating this. The tool user then selects the torque setting by means of switch 79 which torque setting is selected by the user according to the type of material that he is working with.

Thus, once the torque setting is set and the direction of rotation of the tool bit is set, the user is now ready to employ the tool. The user then grasps the handle 11 of FIG. 1 and exerts pressure on the stationary switch 17 which transfers the pressure to the piezoresistors 61 and 62. This causes a voltage to appear at the output of the amplifier 68 which voltage is converted to a pulse width modulated signal via modulator 113 and is applied to control the speed of the motor via the gate electrode of the FET 160.

Thus, the voltage produced at the output of amplifier 68 is also converted to a pulse modulated signal via the pulse modulator 113 which pulse modulated signal is applied to gate 115 and via diode 117 to gate 123 and controls the speed of the motor according to the pulse modulated signal by applying this control signal to the gate electrode of the FET. If during operation of the tool, the tool bit encounters increased resistance then the current through the motor begins to increase. The increase in current through the motor raises the voltage across resistor 163. This voltage is monitored by comparator 208 according to the torque setting as further determined by transistors 200 to 203. If a required torque or speed is exceeded for the particular range, comparator 208 provides an output which bias the FET 160 OFF thereby cutting the voltage to the motor 150 and stopping. If during any time the user releases the trigger mechanism 60, this condition is sensed by the comparator 78 and via capacitor 95 applies a pulse to gate 98 which causes transistor 99 to switch completely reversing direction of the motor. The motor stops due to the fact that there is no voltage produced by the bridge and hence no voltage via amplifier 68 to turn the FET off.

When the screw is seated, the controller stalls the tool and hence prevents armature heating of the motor which would otherwise occur. This is accomplished as follows. When a screw is seated, there is increased current through the motor which is detected as a voltage across resistor 163 and via diode 164 resistors 162 and 161 together with capacitor 163 forming a time constant. This increased voltage causes capacitor 163 to charge causing comparator 208 to operate and thereby turning FET 160 off. Thus, preventing current flow through the motor and causing the motor to stop.

In any event, if pressure is still applied via trigger switch 60 by the operator then the motor will start again after the above-noted time interval as the gate electrode of FET 160 would be rendered conductive and essentially the motor will try again to place a screw or drill a hole. The reason for this feature is that one may experience an excessively large torque on the tool bit whereby the controller will automatically stop the motor to prevent damage to the motor. In any event, if the operator persists in applying pressure to the trigger switch 60, he will be successful in starting the motor again to again drill through the required piece.

Again, referring to FIG. 3, there is shown complementary transistors as transistor 192 having its collector electrode coupled via resistor 193 to the base electrode of the NPN transistor 194. The collector electrode of transistor 194 is represented by a triangle which indicates a circuit ground return for all other components having the same triangle on the schematic such as the ground returns for transistors 200, 201, 203 and so on. It is also noted that there is an actual ground which for example is coupled to the emitter electrode of transistor 194. In this manner the base electrode of the PNP transistor 192 is coupled via a resistor 120 to the Q output of D flip flop 178. Thus, when the power tool is turned to the On position, the flip flop 178 forward biases transistor 192 and 194 to thereby cause transistor 194 to conduct to therefore place the circuit or triangular ground at the same ground potential as the actual circuit ground. In this manner power is conserved during operation of the tool as in the Off position of the machine tool none of the components as indicated having ground returns (triangle) can conduct. It is also noted that the circuit as shown in FIG. 3 has been implemented utilizing the following components.

The diodes utilized as for example the LED devices are 1N4148's. Diode 151 is a 1N4933 while diode 101 is a 1N4001. The transistors employed as for example transistors 85, 86, 87, 88, 91 and 99 and 116 and 194 are 2N2222. The PNP transistor 192 is a 2N2907. The FET 160 is a IRLZ-24. The amplifier 68, the pulse modulator 113, the comparator 78 as well as comparator 208 are implemented utilizing the LM324 operational amplifier circuit. The AND gates employed are 4093 NAND gate integrated circuits while the OR gates utilized are 4070 integrated circuits. Shift register 84 is a 40175 module while the D flip flops 178 and 180 are 4013 integrated circuit modules. These integrated circuit modules are available from many manufacturers such as GE, Motorola and so on and are standard components. Resistor values for example vary in accordance with standards that are known in the state of the art. The sensors 61 and 62 are piezoresistive sensors mounted on a suitable diaphragm and operative to provide a voltage output according to pressure applied to the zero displacement switch or zero displacement member 60.

Other modifications and alterations of the above-described circuit should be obvious to those skilled in the art and all of such modifications and alterations are encompassed in the claims appended hereto.

We claim:

1. In a portable electric tool having a DC motor for driving a tool bit and for controlling the speed and torque at which said tool bit rotates, the improvement comprising:

a zero displacement switch means coupled to said tool and operative to provide an output voltage proportional to the pressure applied directly to said switch via the hand of the user.

control means coupled to said motor and responsive to said output voltage to variably control the speed of said motor according to the pressure applied to said displacement switch means, said control means including a pulse modulator for converting said output voltage to a pulse width modulated signal at an output of said pulse modulator and means for applying said pulse width modulated signal to said motor for varying the speed of said motor according to said applied pressure, and switching means having first and second output electrodes and a control electrode, with said first output electrode coupled to one terminal of said motor and with said second output electrode coupled to a point of reference potential with said control electrode operative to switch said first and second output electrodes according to a control voltage applied thereto and with said control electrode coupled to said output of said pulse width modulator to operate said switch according to said pulse width modulated signal to therefore control the current through said DC motor and therefore the speed of said motor according to said pulse width modulated signal.

2. The portable electric tool according to claim 1, wherein said control means includes selectable torque control means operative to enable a user to select one of a plurality of different torque ranges for said motor and means coupled to said torque control means for operating said motor within a given range according to said torque range as selected.

3. The portable electric tool according to claim 1, wherein said control means further includes selectable reversing means coupled to said motor and operative to reverse the direction of rotation of said motor in a clockwise or counter clockwise direction.

4. The portable electric tool according to claim 3, further including a comparator having the input responsive to said pressure output voltage and a second input responsive to a threshold reference voltage to provide an output when said pressure output voltage exceeds said threshold and means for applying said comparator output to said motor for reversing the direction of said motor when said comparator provides said output.

5. The portable electric tool according to claim 1, further including, a counter capable of operating in any one of at least three states, input switching means coupled to said counter, to operate said counter in any one of said three states, with a first state indicative of said motor operating in a clockwise direction, a second state indicative of said motor operating in a counter clockwise direction and a third state indicative of said motor in an Off state, with the outputs of said counter coupled to said control means to enable said control means to control said motor speed in said first and second states.

6. The portable electric tool according to claim 1, further including integration means responsive to said pressure output voltage for integrating said voltage at an output and means for applying said integrated voltage to said control means.

7. The portable electric tool according to claim 2, wherein said torque control means includes, a shift register capable of providing a plurality of output states each one indicative of a different torque range, a plurality of range selecting devices each one coupled to and associated with a separate output state of said register to provide a reference voltage for each torque range, a comparator having one input responsive to said range selecting device as selected and one input responsive to the current through said motor and operative to provide an output signal when said motor current exceeds said reference voltage for said range to stop said motor during said comparator output as a function of said torque range as selected.

8. The portable electric tool according to claim 1, wherein said tool is a portable electric drill.

9. The portable electric tool according to claim 1, wherein said tool is a portable electric screw driver.

10. The portable electric tool according to claim 1, wherein said switching means is a field effect transistor having source and drain output electrodes and a gate control electrode.

11. The portable electric tool according to claim 3, wherein said speed reversal means includes a relay having first and second SPDT contacts with the arm of said first SPDT contact coupled to one terminal of said DC motor and with the arm of said second SPDT contact coupled to the other terminal of said DC motor and with the other contacts of said first and second SPDT contacts coupled between a source of operating potential and a reference potential, and means coupled to said relay coil to operate said contacts to thereby reverse the polarity applied to said motor when said coil is operated to enable said motor to rotate in a clockwise or counter clockwise direction.

12. The portable electric tool according to claim 11, wherein said means is a transistor having a collector electrode coupled to said coil, an emitter electrode coupled to a point of reference potential and a base electrode coupled to selectable speed reversing means.

13. The portable electric tool according to claim 1, further including means responsive to said pressure output voltage for dynamically braking said motor when a predetermined pressure voltage is exceeded.

14. The portable electric tool according to claim 5, including display means coupled to said counter for providing a visual display of said states.

15. In a portable electric tool having a DC motor for driving a tool bit and for controlling the speed and torque at which said tool bit rotates, the improvement comprising:
- a zero displacement switch means coupled to said tool and operative to provide an output voltage proportional to the pressure applied directly to said switch via the hand of the user,
- control means coupled to said motor and responsive to said output voltage to variable control the speed of said motor according to the pressure applied to said displacement switch means,
- said control means including selectable torque control means operative to enable a user to select one of a plurality of different torque ranges for said motor and means coupled to said torque control means for operating said motor within a given range according to said torque range as selected, and
- display means coupled to said torque control means for providing a visual display indicative of the torque selected.

16. The portable electric tool according to claim 15, wherein said display means includes a plurality of LED devices with one device for each torque range selected.

* * * * *